Aug. 25, 1936.     E. J. SVENSON     2,051,914
GEAR TOOTH CONSTRUCTION
Filed June 20, 1930
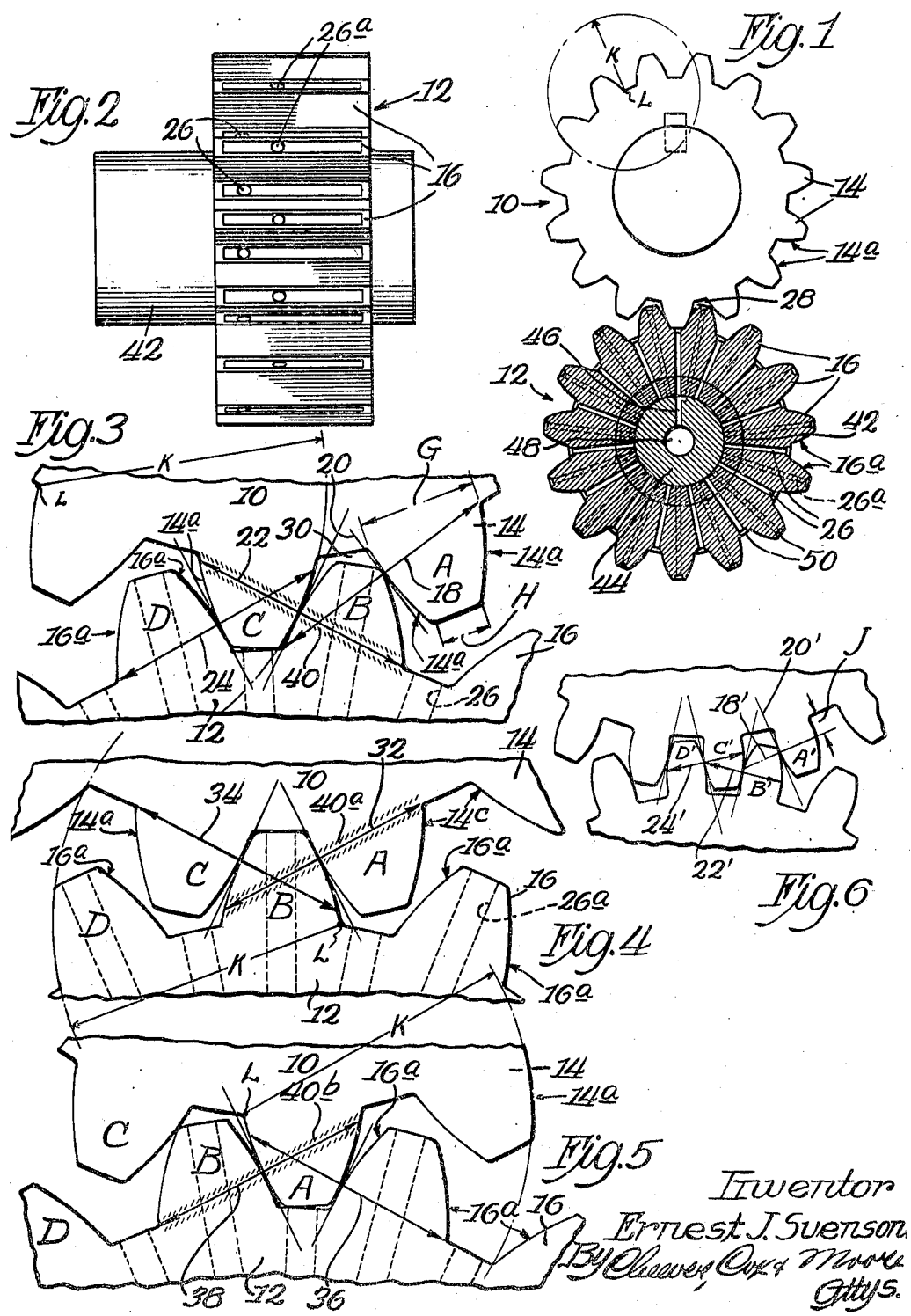
Inventor
Ernest J. Svenson Patented Aug. 25, 1936

2,051,914

UNITED STATES PATENT OFFICE 2,051,914

GEAR TOOTH CONSTRUCTION

Ernest J. Svenson, Rockford, Ill.

Application June 20, 1930, Serial No. 462,466

21 Claims. (Cl. 74—462)

My invention relates generally to gears, and more particularly to improvements in gear tooth constructions.

Due to the particular designs of gear teeth, as for example, the involute teeth which have been commonly employed, considerable difficulty has been experienced in the use thereof. In certain instances considerable sliding contact between meshing teeth has caused development of excessive heat and other injurious effects. The presence of backlash in gear teeth has always been a constant source of trouble. Backlash noise, poor bearing contact between the teeth, improper matching of the teeth, and the like have given manufacturers and users considerable trouble. Another problem which has been presented as a result of improper matching of the gear teeth is that of properly lubricating said teeth. The sliding contact of the meshing teeth serves to break down the oil film and hence materially reduces the operating efficiency of the teeth. Undercut gear teeth have been in common use, and the fact that these teeth have been undercut has materially weakened the same. It is also customary to provide considerable clearance at the tops of the gear teeth, and this clearance is not desirable when gears are employed for certain purposes.

It might be generally stated that it is one of the primary objects of my present invention to avoid the above mentioned and other difficulties which have been experienced heretofore, and in order to accomplish this, I propose to provide a gear tooth construction of improved practical design.

More specifically, it is an object of my present invention to provide in a pair of meshing gears a tooth construction of modified involute form which is much stronger and is capable of being subjected to considerably more strain and stress than conventional types of gear teeth.

Another object is to provide in a pair of meshing gears a tooth construction which is such as to cause the forces to which the meshing teeth are subjected, to act along a zone or line which extends from the root of one tooth to the root of the complementary tooth, thereby eliminating the usual "overhang" of conventional gears, with the result that the gear teeth will stand up under the severest operating conditions.

Another object of my invention is to provide meshing gear teeth having their curved faces so configurated that a rolling contact will be experienced by said faces throughout substantially the entire height of the teeth; in other words, I propose to reduce to a minimum slippage between the faces of the gear teeth during the meshing thereof.

Still another object of my present invention is to provide a gear tooth construction which is particularly adaptable for use in connection with propelling fluids such as oil, and to this end I propose to so construct the gear teeth that each tooth of the gears will extend completely within the bottom of the space presented between complementary teeth in the other gear, and in this way eliminate the possibility of trapping fluid between the gear teeth.

In addition to the above mentioned objects and advantages, I propose to provide meshing gears having tooth constructions as above set forth, which are provided with passageways for communicating with the bottom of the space presented between adjacent gear teeth.

A further object of my invention is to provide a gear tooth construction, in which the cross sectional area of the tooth decreases uniformly from the root to the outer end thereof in a ratio of approximately three to one, thereby presenting a very rigid and smooth running tooth construction.

The foregoing and numerous other objects and advantages will be more apparent from the following detailed description when considered in connection with the accompanying drawing, wherein—

Figure 1 discloses a pair of meshing gears having teeth constructed in accordance with the teachings of my invention;

Figure 2 is an elevational view of the lowermost gear of Figure 1, disclosing the relative positions of the radial ports;

Figures 3, 4, and 5 are enlarged, diagrammatic representations of my improved gear tooth construction, said views serving to disclose three different positions occupied by the gear teeth as said teeth are moved from one meshing position to another, said views serving also to set forth clearly the manner in which my improved tooth construction serves to increase the tooth strength, and also serves to enable a rolling contact between the engaging tooth surfaces over substantially the entire height of the teeth; and Figure 6 is a diagrammatic representation of a conventional involute gear tooth construction, said view being shown for comparing the functional characteristics thereof with my improved construction.

Referring now to the drawing, wherein like numerals have been employed to designate similar parts throughout the various figures, it will be observed that for the purpose of disclosing one practical application of my invention I have shown a pair of meshing gears 10 and 12 which are constructed in accordance with the teachings of my invention. These gears are provided respectively with a plurality of peripheral teeth 14 and 16. For the purpose of more clearly describing the structural characteristics, I shall designate the curved surfaces or faces of the teeth 14 by the numeral 14a, and the faces of the teeth 16 by the numeral 16a.

These faces 14a and 16a do not conform to a standard involute tooth contour, but the teeth might be referred to as being of a modified form, that is, in modification of what is commonly referred to as a standard gear in order to give them a general distinguishing classification. In order to obtain a clear understanding of the structural and functional characteristics of these gear teeth, I have designated certain of them in Figures 3 to 5 inclusive by the letters A, B, C, and D.

It will be observed that the gear teeth 14 and 16 differ from the standard involute form in that the thickness of each tooth decreases uniformly from the dimension G across the root to the dimension H across the top of the tooth. In other words, the tooth cross section decreases uniformly from the root to the top. I have found that a ratio of one to two and three-fourths (1 to 2¾) or one to three (1 to 3) has proved most satisfactory. That is, the ratio of H to G is about one to two and three-fourths (1 to 2¾) or one to three (1 to 3). This ratio enables the tooth to be relatively thick across the root, thereby materially increasing the strength of the tooth.

Attention is also directed to the fact that by employing the curvature of the surfaces 14a and 16a as shown in the drawing, said surfaces will make a rolling contact with each other over substantially the entire height of the teeth. In this manner I have been able to reduce to a minimum the heat generating, sliding contact between the teeth. The only sliding which takes place between the surfaces 14a and 16a is along a small portion of the top and bottom of said surfaces. This sliding is practically negligible in comparison with the frictional contact heretofore experienced in using conventional types of involute gears. Attempts have been made to reduce sliding contact by providing what are commonly known as "stub tooth" gears. However, these stub teeth have not eliminated the difficulties, and differ materially in structural and functional characteristics from teeth of my improved design.

It is difficult to portray in a drawing the actual rolling contact which takes place between the surfaces 14a and 16a, but a study and analysis of the described structure will substantiate this fact. Gears having teeth of my improved design have been used in the field and have proven very serviceable.

In order to more clearly disclose the rolling contact made by the surfaces 14a and 16a, as well as the unique manner in which the forces in the meshing teeth of my design are distributed during the operation of the gear, I have shown in Figures 3 to 5 inclusive three successive positions occupied by the gear teeth.

Consider first the position of the teeth shown in Figure 3. In this position the forces between the teeth A and B are acting along a line or zone designated by the line 18, which is normal to the tangent 20 at its point of tangency. The opposite extremities of this line or zone of force 18 terminate at the root of the tooth A and at the oppositely disposed root of the tooth B. In other words, the force acts between the strongest sections of the teeth and reduces to a minimum the tendency of setting up injurious bending moments in the teeth about their roots.

In order to draw a comparison between the action of the forces in gear teeth of my improved construction and conventional gear teeth, attention is directed to the disclosure in Figure 6. Here I have shown a conventional involute gear tooth construction, and the teeth have been designated by letters corresponding to those in Figure 3, namely, A', B', C', and D'. The line or zone of force acting between the teeth A' and B' is designated by the line 18'. It will be apparent that forces acting along this line 18' tend to set up a decided bending moment about the root of the tooth A' as a result of the "overhang" of the tooth A' designated by the letter J.

Referring again to Figure 3, it will be noted that the zone or line of force acting between the teeth B and C is indicated by the numeral 22, while the line of force acting between the teeth C and D is designated by the numeral 24. All of these lines, namely, lines 18, 20, and 24, pass through the point of tangency between the teeth and are normal to the tangent at this point, and it should be noted that the extremities of these lines terminate at oppositely disposed root portions of the teeth. In other words, regardless of what position the teeth may occupy, the forces act toward the roots of the teeth, and thus avoid the presence of any appreciable "overhang", as described in connection with Figure 6. It will also be seen that the teeth of both gears are so constructed that the tooth of one gear will extend completely within the bottom of the space between complementary teeth of the other gear. Thus my tooth construction differs from conventional types of gear teeth in that the usual clearance at the bottom between the gear teeth is eliminated.

In order to relieve against the building up of pressures in the event that fluid, such as oil, is present between the meshing teeth, I employ a plurality of radial ports 26 and 26a in the gear 12. The ports 26 communicate at one extremity with the bottom of the space between the teeth 16, while the ports or passageways 26a communicate with the outer ends of said teeth. These ports serve to conduct fluid away from areas between the gear teeth, such as the area 28 shown in Figure 1, or the area 30 shown in Figure 3.

In Figure 4 an advanced position of the gear teeth is shown. Also, in Figure 4 said teeth have been moved to the left from the position shown in Figure 3 so that the tooth B now occupies a substantially vertical position and extends completely into the bottom area 30 between the teeth A and C. By constructing normals to the tangents in the manner shown in Figure 3, it will again be seen that the forces between the gear teeth act from the bottom or root in the tooth of one gear to the oppositely disposed bottom or root of the meshing tooth in the other gear. In this connection particular attention is directed to the lines 32 and 34. Thus it will be seen that the line 32 indicates that the forces between the teeth A and B act from the right portion of the root of the tooth A to the left portion of the root of the tooth B, while the line 34 indicates that the forces between the meshing teeth B and C act from the right portion of the root of the tooth B to the left portion of the root of the tooth C.

Referring to Figure 5, it will be seen that a further advancement of the gear teeth to the left has taken place. Here again, by means of lines 36 and 38, the direction in which the forces act between the gear teeth is shown.

Attention is also directed to the fact that the tooth faces 14a and 16a are so configurated that a more substantial or greater bearing surface is presented between said surfaces than is presented between surfaces of gear teeth of conventional design. When meshing gear teeth are working under a load, the pressure between the meshing teeth is sufficient to bring about a certain "area" contact as distinguished from a theoretical "line" contact. If the faces of the teeth are provided with the proper curvature, this "area" contact may be substantially increased, thereby distributing the total pressure or force acting between the teeth over a wider area. For the purpose of more clearly explaining this "area" contact, I have indicated by short cross sectional lines on the teeth B and C in Figures 3 to 5 inclusive a band or zone which is designated generally by the numeral 40 in Figure 3. Thus, the actual "area" contact between the surfaces 14a and 16a of the teeth C and B respectively, which occurs when said teeth are being subjected to a working load, will cause the forces between said teeth to act along this zone 40 rather than along a plane or line indicated by the numeral 22. In this manner the stresses to which the teeth are subjected are distributed over a zone, thereby enabling the teeth to be subjected to extreme working conditions without causing any tooth distortion. In Figure 4 the zone of action of the forces is indicated by the numeral 40a, while in Figure 5 a similar zone is indicated by the numeral 40b.

Attention is also directed to the fact that curved working surfaces of the teeth in each gear conform substantially with arcs of circles, the radius of which, as indicated by the letter K, is equal to substantially three times the height of the gear teeth. In other words, the radius of these circles is greater than twice the width of the roots of the gear teeth. It will also be seen that the above mentioned arc which conforms with the working surface of each tooth is struck from a center positioned at the root of the next adjacent tooth, and I have indicated this center by the letter L. Thus this center L for one tooth is substantially coincident with the working surface at the base of the next adjacent tooth. By having a portion at least of the working surface of each tooth conform with the arc of a circle, the center of which is substantially coincident with the base line of the gear, and the radius of which is substantially equal to three times the height of the gear teeth, I obtain a rolling contact between the meshing teeth of the gears, which represents a decided improvement over tooth structures with which I am familiar. Not only is the strength of the teeth materially increased, but also, I am able to present a tooth structure in which the tooth of one gear is adapted to extend completely within the bottom space presented between complementary teeth in the other gear, and furthermore I am also able to obtain the required area contact between the engaging tooth surfaces. It will also be noted that in my improved gear structure the addendum is equal to the dedendum, and the clearance employed in conventional gear teeth is eliminated.

From the foregoing description it will be apparent that gear teeth constructed in accordance with the design shown in the drawing present a very serviceable and rigid construction. The rolling contact between the faces of the teeth which takes place over substantially the entire height of the teeth reduces slippage between the teeth to a minimum and makes for very smooth functioning of said teeth. By obtaining an "area" contact between the surfaces 14a and 16a as distinguished from the usual "line" contact, the forces acting on the meshing teeth are distributed over a relatively wide area of the tooth structure, and thereby reduces the pressure per unit area. By having the forces act toward the roots of the teeth and thereby eliminating the usual "overhang" such as the "overhang" J shown in Figure 6, the teeth are adapted to be subjected to extreme working conditions without the slightest tendency of showing any distortion or strain. By so configurating the surfaces 14a and 16a that the cross section of each tooth uniformly decreases from the root to the outer end, I am able to provide a gear tooth which is far superior in strength and operating efficiency over types of involute teeth which have been in common use.

Gears equipped with teeth of the described design are particularly adaptable for use in gear pumps, and in this connection attention is directed to several other applications which I have filed relating to improvements in propelling mechanism, such as gear pumps, particular reference being made to my application, Serial No. 430,868, filed February 24, 1930, wherein a cross reference is made to the specific tooth construction disclosed in the present application. Reference is also made to my co-pending application, Serial No. 437,959, filed March 22, 1930, wherein a gear pump construction is disclosed, to which the present invention is particularly adaptable. It will be noted in Figures 1 and 2 that the gear 12 is mounted upon a sleeve 42, and this sleeve is in turn rotatable upon a suitable support or valve member 44. This valve member 44 is provided with a peripheral port 46 which communicates with a central longitudinal passageway 48, thereby enabling fluid to be automatically directed away from the meshing gear teeth. The present invention is not directed to a pumping mechanism, and claims drawn to this specific pumping arrangement are included in my above mentioned co-pending applications. However, for the purpose of more clearly disclosing one practical application of my improved gear tooth construction, I have shown the same as being adaptable for use in gear pump constructions. In order to facilitate the withdrawal of fluid through the radial ports or passageways 26 and 26a, I provide recesses 50 which extend longitudinally of the tops of the gear teeth, as well as longitudinally of the area at the bottom of the spaces between said teeth.

It will also be apparent from the foregoing description that the center L of the circle shown in Fig. 1 is coincident with a circular line which might be considered as the "root circle." I call this the "root circle" simply because it is the circle which includes the root portions of the teeth and is coincident with the peripheral surfaces positioned at the bottom of the spaces between the teeth. Experience has shown that gear teeth constructed in accordance with the teachings of the present invention are free from what is commonly known to those skilled in the art as "kick back." In other words, as the two working surfaces of companion teeth roll together, the compensation afforded by the curvature of one surface for the curvature on the companion tooth surface is such as to insure constant velocity of rotation of the driven gear. Stated in another way, the circular surface of one tooth coacts with the circular surface of the companion tooth in a manner to positively preclude any pulsating or non-uniform rotation of the driven gear. Care must be exercised in properly locating the centers from which the curvature of the working surfaces of the teeth are struck. Thus, if the center is so positioned as to cause companion working surfaces of each tooth to converge too rapidly and thereby effect the narrowing of the outer portion of the tooth, the above mentioned "kick back" will develop during the operative meshing of the teeth.

Having thus described my invention, what I claim as new and desire to secure by Letters Patent is:

1. A pair of meshing gears, said gears having a plurality of teeth constructed with curved working surfaces terminating at circles presented by the top and bottom of said teeth, the curvature of each tooth from top to bottom being such that during rotation of the gears the curved surface of the tooth in one gear will engagingly match the complementary curved surface in the other gear throughout the extent of said surfaces when considered from the bottom to the top of each tooth, whereby to present a tooth in one gear having the top width conforming with the bottom width of mating space in the other gear, said curved surfaces conforming substantially with an arc of a circle, the center of which lies in a circle coincident with the root of the teeth in at least one of said gears.

2. A pair of meshing gears, said gears having a plurality of teeth constructed with curved working surfaces terminating at circles presented by the top and bottom of said teeth, the curved surface of each tooth in one gear being adapted to make a rolling contact with a companion tooth in the other gear over a substantial length of said surface considered from the bottom to the top of the teeth, whereby to present a tooth in one gear having the top width conforming with the bottom width of mating space in the other gear, said curved surfaces conforming substantially with an arc of a circle, the center of which lies in a circle coincident with the root of the teeth in at least one of said gears.

3. A pair of meshing gears, said gears having a plurality of teeth constructed with curved working surfaces terminating at circles presented by the top and bottom of said teeth, the opposed surfaces of said teeth being curved to present a substantially uniform decrease in cross sectional area from the root to the top, whereby the cross sectional area at the root will be approximately three times the cross sectional area at the top, and whereby to present a tooth in one gear having the top width conforming with the bottom width of mating space in the other gear, said curved surfaces conforming substantially with an arc of a circle.

4. A pair of meshing gears, said gears having a plurality of teeth constructed with curved working surfaces terminating at circles presented by the top and bottom of said teeth, the opposed surfaces of said teeth being curved to present a rolling contact throughout a substantial portion of the entire height thereof, the top of a tooth in one gear being equal in width to the bottom width of the complementary space in the other gear, thereby adapted to extend completely within the bottom space presented between complementary teeth of said other gear, said curved surfaces conforming substantially with an arc of a circle, the center of which lies in a circle coincident with the root of the teeth in at least one of said gears.

5. A pair of meshing gears, said gears having a plurality of teeth constructed with curved working surfaces terminating at circles presented by the top and bottom of said teeth, the width of the top of each tooth of one gear conforming with the bottom width of the complementary space in the other gear and thereby adapted to extend completely within the bottom space presented between complementary teeth of said other gear, said curved surfaces conforming substantially with an arc of a circle, the center of which lies in a circle coincident with the root of the teeth in at least one of said gears.

6. A pair of meshing gears, said gears having a plurality of teeth constructed with curved working surfaces terminating at circles presented by the top and bottom of said teeth, the width of the top of each tooth of one gear conforming with the width of and thereby being adapted to extend completely within the bottom space presented between complementary teeth of the other gear, the working surfaces of the teeth conforming with an arc of a circle, and a passageway in one of said gears adapted to communicate with the area presented between said complementary teeth.

7. A pair of meshing gears, said gears having a plurality of teeth constructed with curved working surfaces terminating at circles presented by the top and bottom of said teeth, the width of the top of each tooth of one gear conforming with the width of and thereby being adapted to extend completely within the bottom space presented between complementary teeth of the other gear, the working surfaces of the teeth conforming with an arc of a circle, and a radial passageway in one of said gears adapted to communicate with the area presented between said complementary teeth.

8. A pair of meshing gears, said gears having a plurality of teeth constructed with curved working surfaces terminating at circles presented by the top and bottom of said teeth, the width of the top of each tooth of one gear conforming with the width of and thereby being adapted to extend completely within the bottom space presented between complementary teeth of the other gear, the working surfaces of the teeth conforming with an arc of a circle, and a plurality of radial passageways terminating at the outer extremities of the teeth in one of said gears.

9. A pair of meashing gears, said gears having a plurality of teeth constructed with curved working surfaces terminating at circles presented by the top and bottom of said teeth, the width of the top of each tooth of one gear conforming with the width of and thereby being adapted to extend completely within the bottom space presented between complementary teeth of the other gear, the profile of the teeth in one gear being similar to the profile of the teeth in the other gear, the working surfaces of the teeth conforming with an arc of a circle, and a plurality of passageways terminating at the bottom of the space presented between adjacent teeth in one of said gears.

10. A pair of meshing gears, said gears having a plurality of teeth constructed with curved working surfaces terminating at circles presented by the top and bottom of said teeth and having working surfaces conforming substantially with an arc of a circle, the curved faces on said teeth being such that a line perpendicular to the tangent at the point of contact between a pair of meshing teeth will extend from the root of one tooth to the root of the other teeth, thereby presenting a strong tooth construction which will insure constant velocity of rotation, the width of the top of the teeth in one gear conforming with the bottom width of the complementary spaces in the other gear.

11. A pair of meshing gears, said gears having a plurality of teeth constructed with curved working surfaces terminating at circles presented by the top and bottom of said teeth and having working surfaces conforming substantially with an arc of a circle, the teeth being so constructed that forces acting upon the meshing teeth will be transmitted along a zone which traverses said meshing teeth from the root of the tooth in one gear to the oppositely disposed root of the complementary tooth in the other gear which will insure constant velocity of rotation, the width of the top of the teeth in one gear conforming with the bottom width of the complementary spaces in the other gear.

12. A pair of meshing gears, said gears having a plurality of teeth constructed with curved working surfaces terminating at circles presented by the top and bottom of said teeth and having working surfaces conforming substantially with an arc of a circle, the curved faces on said teeth being such that a line perpendicular to the tangent at any point of contact between a pair of meshing teeth will extend from the root of one tooth to the root of the other teeth, thereby presenting a strong tooth construction which will insure constant velocity of rotation, the width of the top of the teeth in one gear conforming with the bottom width of the complementary spaces in the other gear.

13. A pair of meshing gears, said gears having a body portion and a plurality of teeth constructed with curved working surfaces terminating at circles presented by the top and bottom of said teeth, the curvature of the face and flank of each tooth in at least one of said gears, when considered with respect to a plane extending between the extremities of said curvature, presenting an arc which is symmetrical with respect to the medial portion of said plane, said arc conforming with an arc of a circle, the width of the top of the teeth in one gear conforming with the bottom width of the complementary spaces in the other gear, said teeth being adapted to make rolling contact with each other over a substantial portion of the entire height thereof.

14. A pair of meshing gears, said gears having a plurality of teeth constructed with curved working surfaces terminating at circles presented by the top and bottom of said teeth, the opposed surfaces of each tooth in at least one of said gears having a curvature which, when considered in cross section transversely of the gear axis, is substantially uniform throughout its length and extends from the root to the outer end of the tooth, said curvature conforming with the arc of a circle, the width of the top of the teeth in one gear conforming with the bottom width of the complementary spaces in the other gear, said teeth being adapted to make rolling contact with each other over a substantial portion of the entire height of the teeth.

15. A pair of meshing gears, said gears having a plurality of teeth constructed with curved working surfaces terminating at circles presented by the top and bottom of said teeth, each of the opposed surfaces of a tooth in at least one of said gears, when considered in cross section transversely of the gear axis, having the highest point of its curvature substantially midway between the root and top of the tooth, said curvature conforming with the arc of a circle, the width of the top of the teeth in one gear conforming with the bottom width of the complementary spaces in the other gear, said teeth being adapted to make rolling contact with each other over a substantial portion of the entire height thereof.

16. A pair of meshing gears, said gears having a plurality of teeth constructed with curved working surfaces terminating at circles presented by the top and bottom of said teeth, the opposed surfaces of each tooth in at least one of said gears having a curvature, which, when considered in cross section transversely of the gear axis, is substantially uniform throughout its length and extends from the root to the outer end of the tooth, said curvature conforming with a circle, the center of which lies in a circle coincident with the root of said teeth, said teeth being adapted to make rolling contact with each other over a substantial portion of the entire height of the teeth, the width of the top of the tooth in one gear conforming with the width of and thereby being adapted to extend completely within the bottom of the space presented between complementary teeth of the other gear.

17. A gear having each tooth thereof formed with working surfaces conforming substantially with the arc of a circle, the radius of which is at least three times the height of the gear teeth, and the center of which lies in a circle coincident with the root of said teeth.

18. A gear having each tooth thereof formed with working surfaces conforming substantially with the arc of a circle, the radius of which is greater than twice the thickness of a tooth at the root thereof and the center of which lies in a circle coincident with the root of said tooth.

19. A gear having each tooth thereof formed with working surfaces conforming substantially with the arc of a circle, the circle companion to the working surface of one tooth having its center substantially coincident with the working surface at the base of the next adjacent tooth.

20. A gear having each tooth thereof formed with working surfaces conforming with the arc of a circle, the circle companion to the working surface of one tooth having its center coincident with a circle which is coincident with the peripheral surface at the bottom of the space between the teeth, the radius of said circle being greater than twice the thickness of a tooth at the root thereof.

21. A pair of meshing gears, said gears having a plurality of teeth provided with curved working surfaces conforming substantially with the arc of a circle, said arc being struck from a center which is so disposed as to present complementary meshing teeth, the curved working surfaces of which, from top to bottom, engagingly match throughout the extent of said surfaces, and wherein the top of one gear tooth will fill the complementary bottom space in the other gear when said tooth and space are positioned symmetrically with respect to each other.

ERNEST J. SVENSON.